(12) United States Patent
Nagahara

(10) Patent No.: US 11,936,820 B2
(45) Date of Patent: Mar. 19, 2024

(54) IMAGE FORMING APPARATUS FOR DETERMINING WHETHER A CONNECTED WIRELESS LAN CHIP IS OPERABLE AT A PARTICULAR SETTING, CONTROL METHOD THEREOF, AND STORAGE MEDIUM

(71) Applicant: Canon Kabushiki Kaisha, Tokyo (JP)

(72) Inventor: Ryuji Nagahara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/152,827

(22) Filed: Jan. 11, 2023

(65) Prior Publication Data
US 2023/0239414 A1 Jul. 27, 2023

(30) Foreign Application Priority Data
Jan. 21, 2022 (JP) ................................ 2022-008197

(51) Int. Cl.
*H04N 1/00* (2006.01)

(52) U.S. Cl.
CPC ..... *H04N 1/00087* (2013.01); *H04N 1/00037* (2013.01); *H04N 1/00076* (2013.01); *H04N 1/0009* (2013.01); *H04N 1/00244* (2013.01); *H04N 1/00891* (2013.01); *H04N 2201/0094* (2013.01)

(58) Field of Classification Search
CPC .................. H04N 1/00087; H04N 1/00244
See application file for complete search history.

(56) References Cited

U.S. PATENT DOCUMENTS

| | | | | |
|---|---|---|---|---|
| 2006/0116166 A1* | 6/2006 | Hibino | .................. | H04W 28/18 455/557 |
| 2014/0300915 A1* | 10/2014 | Ishikura | ............. | H04N 1/00204 358/1.13 |
| 2017/0344320 A1* | 11/2017 | Morita | .................. | G06F 3/1292 |
| 2020/0110562 A1* | 4/2020 | Nagahara | .............. | G06F 3/1236 |

FOREIGN PATENT DOCUMENTS

JP 2020-028047 A 2/2020

* cited by examiner

*Primary Examiner* — Benjamin O Dulaney
(74) *Attorney, Agent, or Firm* — Venable LLP

(57) ABSTRACT

An image forming apparatus connectable to a plurality of types of wireless Local Area Network (LAN) chips is provided. The image forming apparatus includes an identification unit configured to identify a capability of a wireless LAN chip connected to the image forming apparatus, a reception unit configured to receive an instruction to import a setting value, a determination unit configured to determine whether the wireless LAN chip connected to the image forming apparatus is operable at the setting value based on the identified capability, and a reflection unit configured to reflect the setting value for the wireless LAN chip connected to the image forming apparatus in a case where it is determined that the wireless LAN chip connected to the image forming apparatus is operable at the setting value.

18 Claims, 11 Drawing Sheets

FIG. 4

| VENDOR ID | DEVICE ID | 2.4GHz | 5GHz | WPA | WPA2 | WPA3 |
|---|---|---|---|---|---|---|
| A | XXXXX | ✓ | — | ✓ | ✓ | — |
| A | YYYYY | ✓ | — | ✓ | ✓ | ✓ |
| A | ZZZZZ | ✓ | ✓ | ✓ | ✓ | ✓ |
| ... | ... | ... | ... | ... | ... | ... |
| B | LLLLL | ✓ | ✓ | ✓ | ✓ | — |
| B | MMMMM | ✓ | ✓ | ✓ | ✓ | ✓ |
| B | NNNNN | ✓ | — | ✓ | ✓ | ✓ |

IMAGE FORMING APPARATUS FOR DETERMINING WHETHER A CONNECTED WIRELESS LAN CHIP IS OPERABLE AT A PARTICULAR SETTING, CONTROL METHOD THEREOF, AND STORAGE MEDIUM

BACKGROUND OF THE INVENTION

Field of the Invention

The present invention relates to an image forming apparatus, a control method thereof, and a storage medium.

Description of the Related Art

In recent years, the number of settable items in image forming apparatuses has increased in conjunction with advances in multifunctionalization. To reduce a work load in setting a plurality of items by manual work, a mechanism of collectively importing or exporting a plurality of setting values is provided. There are items in image forming apparatuses for which a condition is imposed for a setting value to be reflected, such as an item that cannot be set when a license is not installed or an item that is not displayed when an external device is not connected. Additionally, there are items that are not present depending on a model and items having different settable values depending on a connected external device. Therefore, there may be a case where, after setting is performed in a single image forming apparatus, when a user attempts to export a setting value of the image forming apparatus and import the setting value to another image forming apparatus, the other image forming apparatus does not satisfy the condition for reflecting the setting value. Japanese Patent Laid-Open No. 2020-028047 proposes conversion of a setting value in accordance with a specification of an image forming apparatus as an import target such that the setting value can be imported to an image processing apparatus having a different specification. A wireless LAN chip connected to the image forming apparatus may have different settable values depending on the type of the wireless LAN chip. When a wireless LAN chip connected to the image forming apparatus is uniquely determined, a setting value to be imported can be converted by a method such as that of Japanese Patent Laid-Open No. 2020-028047. However, in an image forming apparatus that can use a plurality of types of wireless LAN chips, settable values are different depending on the type of the wireless LAN chip to be connected, and therefore such a conversion cannot be performed. Therefore, a setting value that cannot be used in the connected wireless LAN chip may be imported.

SUMMARY OF THE INVENTION

An aspect of the present disclosure provides a technology for importing suitable setting values. According to an embodiment, an image forming apparatus connectable to a plurality of types of wireless Local Area Network (LAN) chips, the image forming apparatus comprising: an identification unit configured to identify a capability of a wireless LAN chip connected to the image forming apparatus; a reception unit configured to receive an instruction to import a setting value; a determination unit configured to determine whether the wireless LAN chip connected to the image forming apparatus is operable at the setting value based on the identified capability; and a reflection unit configured to reflect the setting value for the wireless LAN chip connected to the image forming apparatus in a case where it is determined that the wireless LAN chip connected to the image forming apparatus is operable at the setting value is provided.

Further features of the present invention will become apparent from the following description of exemplary embodiments with reference to the attached drawings.

BRIEF DESCRIPTION OF THE DRAWINGS

FIG. 4 is a diagram for explaining an information table example according to the various embodiments.

DESCRIPTION OF THE EMBODIMENTS

Figure 1:
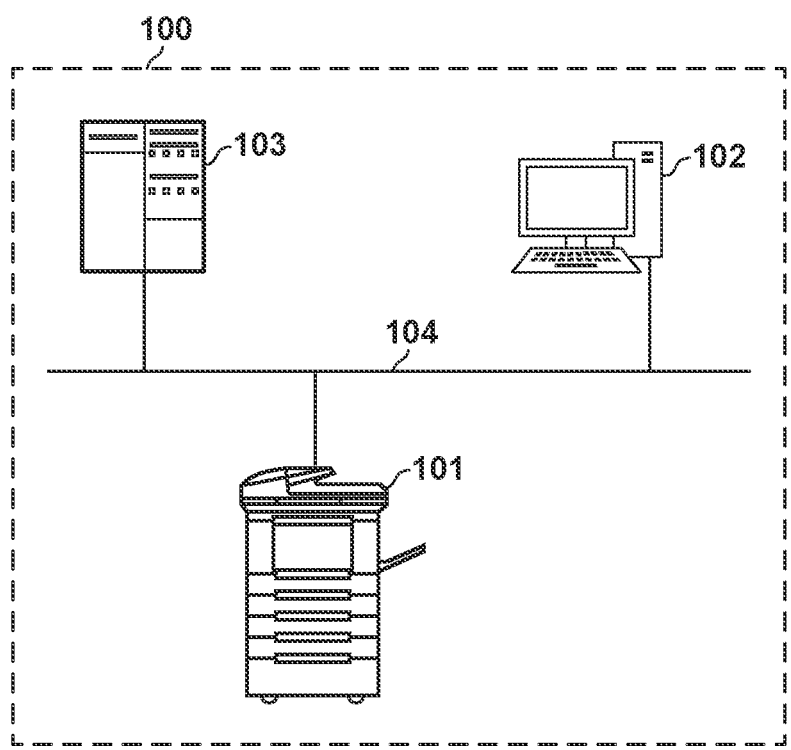
FIG. 1 is a block diagram for explaining a configuration example of a system according to various embodiments.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

A configuration example of a system 100 according to the first embodiment will be described with reference to FIG. 1. The system 100 includes an image forming apparatus 101, a Personal Computer (PC) 102, and a server 103. In the example of FIG. 1, the system 100 includes each one of the image forming apparatus 101, the PC 102, and the server 103, but the system 100 may include a plurality of the respective apparatuses. The image forming apparatus 101 may perform a plurality of functions, such as printing, scanning, and copy, according to instructions from a user of the system 100. The image forming apparatus 101 having the plurality of functions in this manner is also referred to as a Multifunction Peripheral (MFP). The PC 102 may operate as a client for the user of the system 100 to input a job to the image forming apparatus 101. The server 103 may store setting values pertaining to the image forming apparatus 101, and store image data formed by the image forming apparatus 101.

The image forming apparatus 101, the PC 102, and the server 103 are connected via a Local Area Network (LAN) 104. Each of the apparatuses in the system 100 may be wired and connected to the LAN 104, or wirelessly connected to the LAN 104.

The image forming apparatus 101 may be able to generate export data representing the setting value according to the instruction to export the setting value pertaining to the image forming apparatus 101, and output the export data to an external device (for example, the server 103). The instruction to export the setting value pertaining to the image forming apparatus 101 is hereinafter simply represented to as an export instruction. The image forming apparatus 101 may receive the export instruction from the PC 102 or the server 103 through the LAN 104, or may receive the export instruction through an operation unit 206 (FIG. 2) in the image forming apparatus 101. The setting values included in the export data may be setting values pertaining to all items of the image forming apparatus 101, or may be setting values pertaining to some items designated by the user. For example, the export data may include an address book, an administrator, and a network setting. In the export data, the setting value pertaining to the image forming apparatus 101 may be represented by a numerical value, a character string, or another format. The data format of the export data may be a dedicated data format developed by a vendor of the image forming apparatus 101, or may be a general-purpose data format, such as Comma Separated Values (CSV).

The image forming apparatus 101 may receive the import data representing the setting value from an external device (e.g., the server 103) in accordance with the instruction to import the setting value pertaining to the image forming apparatus 101, and can reflect the instructed setting value to the image forming apparatus 101. The instruction to import the setting value pertaining to the image forming apparatus 101 is hereinafter simply represented as an import instruction. The content and the format of the import data may be the same as the content and the format of the export data.

The import data may be, for example, export data exported from an image forming apparatus different from the image forming apparatus 101. In this case, the setting value of the image forming apparatus 101 can be identical to the setting value of the different image forming apparatus by simple operation. In addition, the import data may be export data exported in the past from the image forming apparatus 101. In this case, the setting value of the image forming apparatus 101 can be returned to own past setting value by simple operation.

Figure 2:
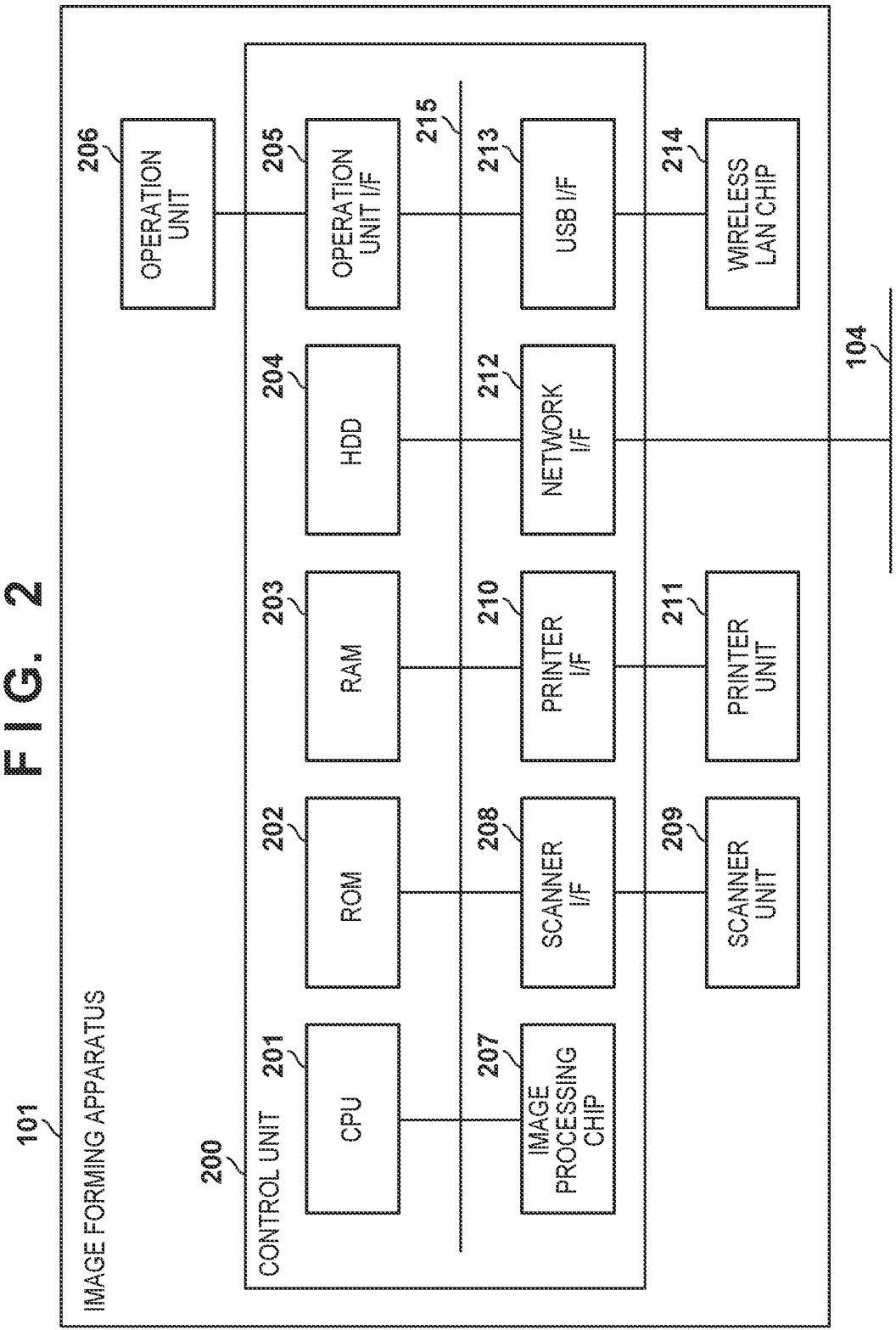
FIG. 2 is a block diagram for explaining a hardware configuration example of the image forming apparatus according to the various embodiments.

With reference to FIG. 2, a hardware configuration example of the image forming apparatus 101 will be explained. In FIG. 2, an example in which the image forming apparatus 101 is an MFP will be described, but the image forming apparatus 101 may be able to perform only a single function. For example, the image forming apparatus 101 may be able to perform only one of a scanning function, a printing function, and a copy function. The image forming apparatus 101 includes components illustrated in the image forming apparatus 101 in FIG. 2. Additionally, in the present embodiment, it is assumed that the apparatus that receives the import data is an image forming apparatus, but the apparatus is not limited thereto. For example, the present embodiment can be applied to a wide variety of communication devices and information processing apparatuses that can connect wireless communication chips compliant with IEEE 802.11 series. For example, the device to which the present embodiment is applied may be a router device that relay wireless communications compliant with IEEE 802.11 series, a digital still camera, a network camera, a Magnetic Resonance Imaging (MRI) apparatus, and a portable medical device.

A control unit 200 controls the operation of the image forming apparatus 101. The control unit 200 includes the components illustrated inside the control unit 200 in FIG. 2. A Central Processing Unit (CPU) 201 is a general-purpose processor for performing the operation by the control unit 200. A Read Only Memory (ROM) 202 is a non-volatile storage device, and stores, for example, a boot program of the image forming apparatus 101. A Random Access Memory (RAM) is a volatile storage device, and functions as a system work memory for the CPU 201 to operate and a memory for temporarily storing image data. A RAM 203 may be configured by a Static RAM (SRAM), or may be configured by a Dynamic RAM (DRAM). The content stored in the SRAM is retained even after a power source of the image forming apparatus 101 is turned off and the power supply to the SRAM is stopped. The content stored in the DRAM is erased when the power source of the image forming apparatus 101 is turned off and the power supply to the SRAM is stopped. The operation by the control unit 200 may be performed by the CPU 201 executing a program stored in the ROM 202 or the RAM 203.

A Hard Disk Drive (HDD) 204 is a non-volatile storage device, and stores image data, various programs, and various information tables. An operation unit interface (I/F) 205 is an interface for connecting a system bus 215 and the operation unit 206. The operation unit I/F 205 acquires the image data for display on the operation unit 206 through the system bus 215, and outputs the information input from the operation unit 206 to the system bus 215. The operation unit 206 may be configured by a display unit and an input unit. The display unit may include, for example, a liquid crystal display device. The input unit may be configured by a touchpad or a keypad. The display unit and the input unit may be integrally configured as a touch screen.

An image processing chip 207 is a device that performs image processing. A scanner I/F 208 is an interface for connecting the system bus 215 and a scanner unit 209. The scanner I/F 208 corrects, processes, and edits the image data received from the scanner unit 209. The scanner I/F 208 may determine the type of received image data (for example, a color document or a black-and-white document, a letter document or a photo document). The scanner I/F 208 associates the determination result with the image data. The information associated with the image data is referred to as attribute data. The scanner unit 209 generates image data by scanning the document.

A printer I/F 210 is an interface for connecting the system bus 215 and a printer unit 211. The printer I/F 210 receives the image data transmitted from the image processing chip 207, and performs image processing on the image data with reference to the attribute data associated with the image data. The image data after image processing is transferred from the control unit 200 to the printer unit 211 via the printer I/F 210 and printed on a recording medium in the printer unit 211.

A network I/F 212 is an interface for connecting the system bus 215 and the LAN 104. The network I/F 212 performs wired communications between the image forming apparatus 101 and a device connected to the LAN 104.

A Universal Serial Bus (USB) I/F 213 is an interface for connecting the system bus 215 and a wireless LAN chip 214. To the USB I/F 213, for example, the wireless LAN chip 214 that allows wireless LAN communication compliant with the Institute of Electrical and Electronics Engineers (IEEE) 802.11 standard is connected. In a case where the wireless LAN chip 214 is connected to the image forming apparatus 101 and the use of the wireless LAN chip 214 by the image forming apparatus 101 is set, the control unit 200 wirelessly communicates with, for example, a wireless LAN access point using the wireless LAN chip 214.

As the wireless LAN chip 214, a plurality of types of wireless LAN chips may be connectable to the image forming apparatus 101. The plurality of types of wireless LAN chips may have mutually different capabilities. For example, the wireless LAN chip may have different capabilities in at least one of a frequency band (such as 2.4 GHz/5 GHz) and an encryption standard (such as WEP/WPA/WPA2/WPA3). For example, the wireless LAN chip 214 can use a frequency band of 2.4 GHz and WEP and WPA, but may be a wireless LAN chip that cannot use the frequency band of 5 GHz or WPA2 or WPA3. Alternatively, the wireless LAN chip 214 may be a wireless LAN chip that can use the frequency band of 2.4 GHz and 5 GHz, and WEP, WPA, WPA2, and WPA3. The image forming apparatus 101 may be operable in a state where the wireless LAN chip 214 is not connected. In this case, the image forming apparatus 101 may communicate with an external device with a wire through the network I/F 212.

Figure 3:
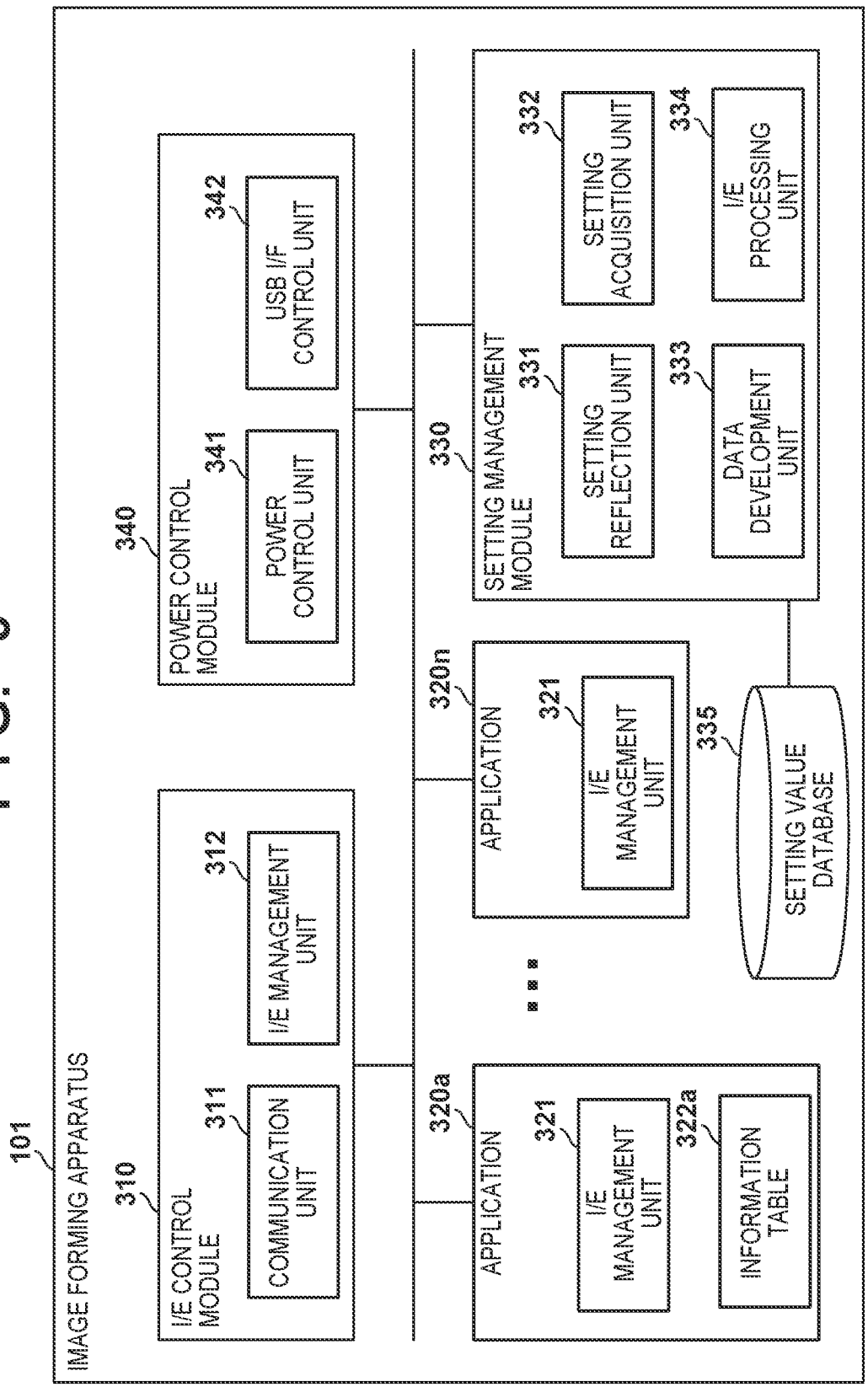
FIG. 3 is a block diagram for explaining a software configuration example of the image forming apparatus according to the various embodiments.

A software configuration example of the image forming apparatus 101 will be explained with reference to FIG. 3. The software used by the image forming apparatus 101 may be stored as a program in the ROM 202, and may be loaded into the RAM 203 by the CPU 201 during execution. In FIG. 3, modules used in the present embodiment will be mainly described among software modules for causing the image forming apparatus 101 to function.

An import/export (I/E) control module 310 performs processing of reflecting the setting value included in the import data to the image forming apparatus 101 and processing of exporting the setting value of the image forming apparatus 101. The processing of reflecting the setting value included in the import data to the image forming apparatus 101 may replace the setting value of a specific item of the image forming apparatus 101 with a setting value represented by the import data. An I/E management unit 312 in the I/E control module 310 instructs an application 320 that manages the setting values of the image forming apparatus 101 to export the setting values in response to receiving the export instruction.

The image forming apparatus 101 includes a plurality of applications 320a to 320n for achieving functions that the image forming apparatus 101 has. The applications 320a to 320n are collectively represented as the application 320. The following description of the application 320 applies to all of the applications 320a to 320n. The applications 320a to 320n may include a COPY application to operate a COPY function that prints image data received from the scanner unit 209. The applications 320a to 320n may also include a SEND application that causes a SEND function, which transmits the image data received from the scanner unit 209 to, for example, the PC 102, to operate.

An I/E processing unit 321 in the application 320 requests a setting acquisition unit 332 in a setting management module 330 to acquire the setting value of the image forming apparatus 101 held in a setting value database 335. The setting acquisition unit 332 in the setting management module 330 acquires the setting value of the image forming apparatus 101 from the setting value database 335. An I/E processing unit 334 in the setting management module 330 registers the acquired setting value of the image forming apparatus 101 as the setting value to be exported. After the registration of the setting value to be exported is completed, the I/E processing unit 334 in the setting management module 330 converts the registered setting value into an exportable format. Subsequently, the I/E management unit 312 in the I/E control module 310 summarizes the setting values changed to the exportable format as an export file. Thereafter, a communication unit 311 in the I/E control module 310 transmits the export data to an external device (e.g., the server 103) via the network I/F 212 or via the wireless LAN chip 214 connected to the USB I/F 213.

In a case where the import instruction is received, the communication unit 311 in the I/E control module 310 receives the import data via the network I/F 212 or via the wireless LAN chip 214 connected to the USB I/F 213. Subsequently, the I/E management unit 312 instructs the setting management module 330 to develop the import data into the format readable by the application 320. A data development unit 333 in the setting management module 330 develops the import data into a format readable by the application 320 in accordance with the instruction from the I/E management unit 312.

The I/E management unit 312 in the I/E control module 310 refers to the developed import data and instructs the application 320, which manages the items of the setting values included in the import data, to import. The I/E processing unit 321 in the application 320 to which the import is instructed acquires setting values of the import data that it manages from the I/E processing unit 334 in the setting management module 330. Subsequently, the I/E processing unit 321 in the application 320 stores the acquired setting values of the import data in the setting value database 335 via a setting reflection unit 331. By such a process, the setting value instructed to be imported is reflected to the image forming apparatus 101.

A power control module 340 manages the power state of the image forming apparatus 101. A power control unit 341 manages power supply to the hardware constituting the image forming apparatus 101, and receives an instruction (start/stop) pertaining to the power supply from the application 320. The power control unit 341 instructs a USB I/F control unit 342 to start/stop the power supply to the USB I/F 213 in response to receiving an instruction (start/stop) pertaining to the power supply from the application 320 to the USB I/F 213. The USB I/F control unit 342 controls start/stop of power supply to the USB I/F 213 in response to the instruction from the power control unit 341. The power control module 340 may restart the image forming apparatus 101.

The image forming apparatus 101 includes the application 320a that manages wireless communication. The application 320a performs wireless communication using the wireless LAN chip 214 connected to the image forming apparatus 101, specifically the USB I/F 213. The application 320a uses an information table 322a to manage the types of wireless LAN chips usable by the image forming apparatus 101 and the ability of the wireless LAN chips. The application 320a also manages whether the wireless LAN chip 214 is set to be used or set to be unused. The use of the wireless LAN chip 214 being set may be represented as the wireless LAN chip 214 being valid. The wireless LAN chip 214 being set to be unused may be represented as the wireless LAN chip 214 being invalid.

An example of the information table 322a will be described with reference to FIG. 4. Each record in the information table 322a corresponds to the type of a wireless LAN chip usable by the image forming apparatus 101. That is, the image forming apparatus 101 can use the types of the wireless LAN chips included in the information table 322a, and cannot use other types of wireless LAN chips. A column 401 in the information table 322a indicates a vendor identifier (ID). The vendor ID is identification information that uniquely identifies the vendor that manufactures the wireless LAN chip. A column 402 in the information table 322a indicates a device ID. The device ID is identification information that uniquely identifies the model of the wireless LAN chip manufactured by each vendor. In the present embodiment, the combinations of the vendor IDs and the device IDs are used as the identification information identifying respective types of the plurality of wireless LAN chips. Alternatively, when the device ID is different depending on each vendor, only the device ID may be used as the identification information identifying the type of the wireless LAN chip.

A column 403 in the information table 322a shows a frequency band (2.4 GHz and 5 GHz in the example of FIG. 4) in which each type of the wireless LAN chip is usable. A column 404 in the information table 322a shows an encryption standard (WEP, WPA, WPA2, and WPA3 in the example of FIG. 4) with which each type of wireless LAN chip is usable. Thus, the columns 403, 404 indicate capability information of each type of the wireless LAN chip (in other words, the function supported by the wireless LAN chip). Thus, the information table 322a is a table for managing association information that associates the identification information identifying the respective plurality of types of the wireless LAN chips with the capability information of the wireless LAN chips of the types. In the example of FIG. 4, the frequency band and the encryption standard are shown as the capabilities of the wireless LAN chip, but the information table 322a may manage other capabilities.

Figure 5:
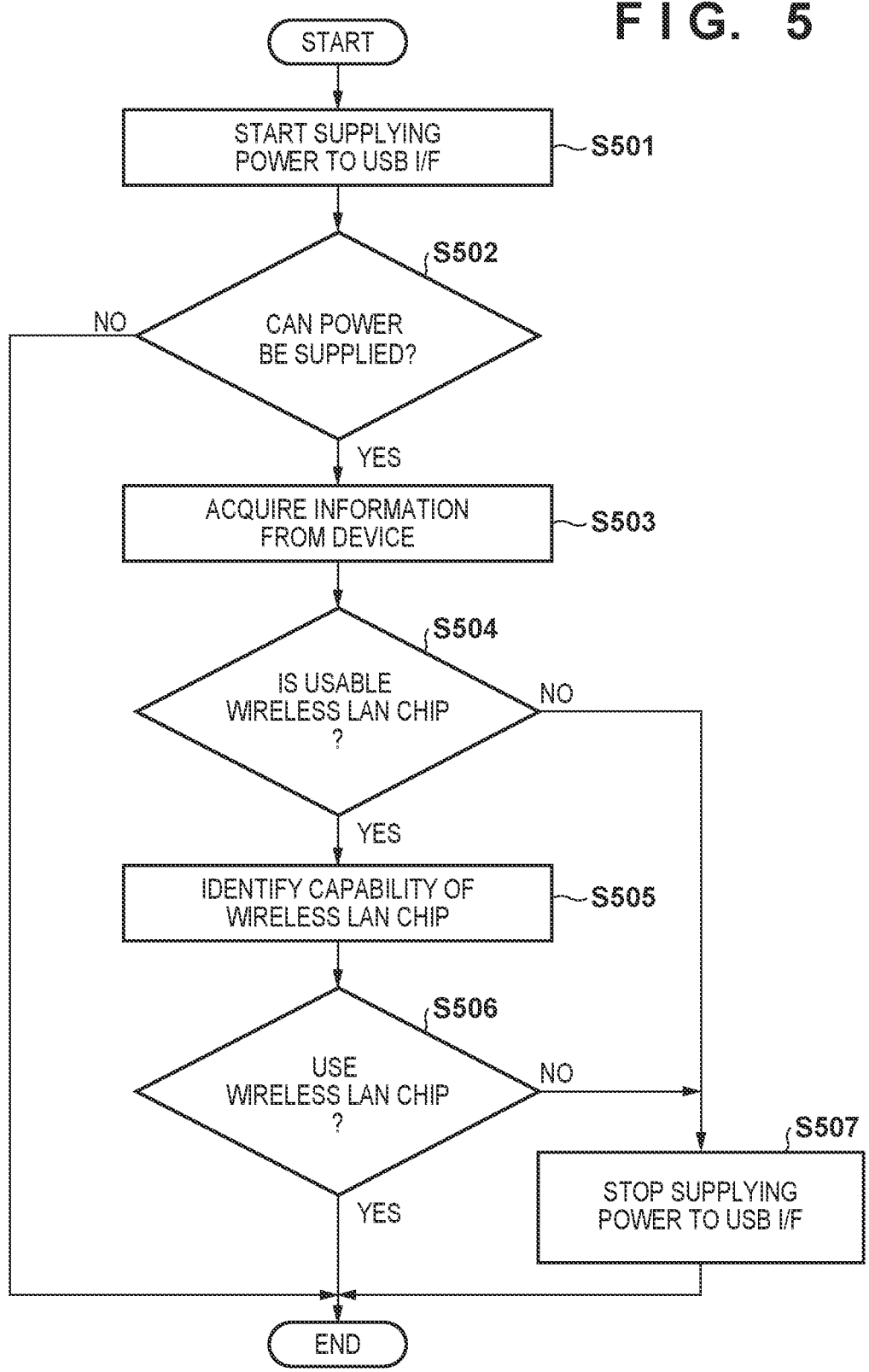
FIG. 5 is a flowchart for explaining an operation example of the image forming apparatus according to a first embodiment.
Figure 6:
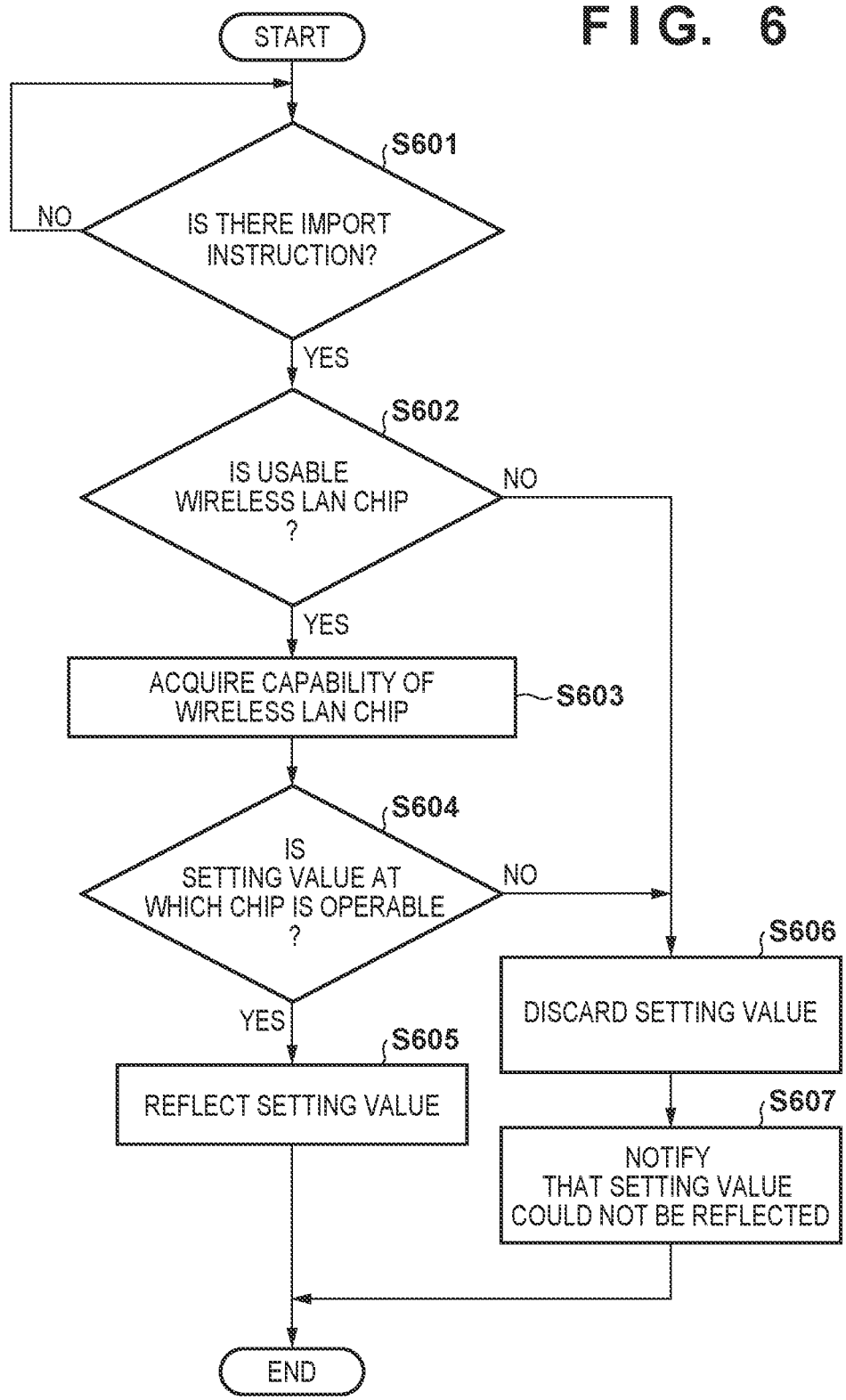
FIG. 6 is a flowchart for explaining an operation example of the image forming apparatus according to the first embodiment.

With reference to FIG. 5 and FIG. 6, the operation example of the image forming apparatus 101 will be explained. The operation of the image forming apparatus 101 is performed by performing a control method that controls the image forming apparatus 101 by the control unit 200. The operation of the image forming apparatus 101 may be performed by the CPU 201 executing a program stored in a memory, such as the ROM 202 or the RAM 203. Alternatively, some or all of the steps in FIG. 5 and FIG. 6 may be performed by a dedicated circuit, such as an Application Specific Integrated Circuit (ASIC).

The method of FIG. 5 is performed at the start of the image forming apparatus 101. In other words, the control unit 200 performs the method of FIG. 5 as part of the startup processing started in response to switching of the power source of the image forming apparatus 101 from off to on. The startup processing may be processing performed until the image forming apparatus 101 becomes usable by the user after the power source of the image forming apparatus 101 is turned on.

At S501, the application 320a instructs the power control unit 341 to start supplying power to a device connected to the USB I/F 213. This instruction may be performed without depending on whether the wireless LAN chip 214 is set to be used (that is, even when the wireless LAN chip 214 is set to be unused). In response to receiving the instruction to start the power supply, the USB I/F control unit 342 starts supplying the power to the device connected to the USB I/F 213.

At S502, the application 320a determines whether it was possible to supply the power to the device connected to the USB I/F 213. When it is determined that it was possible to supply the power ("YES" at S502), the control unit 200 transitions the processing to step S503, and otherwise ("NO" in S502), the control unit 200 ends the processing of FIG. 5. When the device is not connected to the USB I/F 213, the USB I/F control unit 342 cannot supply power to the device to be connected to the USB I/F 213. Additionally, even when the device is connected to the USB I/F 213, in a case where the device cannot receive the power (for example, during a failure), the power cannot be supplied to the device connected to the USB I/F 213.

At S503, the I/E processing unit 321 in the application 320a communicates with the device connected to the USB I/F 213 to acquire a vendor ID and a device ID from the device. As described later, in a case where the device connected to the USB I/F 213 is a wireless LAN chip, the vendor ID and the device ID acquired from the wireless LAN chip are used to identify the capability of the wireless LAN chip.

At S504, the I/E processing unit 321 in the application 320a determines whether the device connected to the USB I/F 213 is a wireless LAN chip usable by the image forming apparatus 101. In a case where it is determined that the wireless LAN chip is usable by the image forming apparatus 101 ("YES" in S504), the control unit 200 transitions the processing to step S505, and otherwise ("NO" in S504), the control unit 200 transitions the processing to S507.

The determination at S504 may be performed based on whether the information table 322a includes the record having the combination of the vendor ID and the device ID acquired at S503. When the information table 322a includes the record having the combination of the vendor ID and the device ID acquired at S503, the device connected to the USB I/F 213 is determined to be a wireless LAN chip usable by the image forming apparatus 101. The wireless LAN chip connected to the USB I/F 213 and usable by the image forming apparatus 101 becomes the wireless LAN chip 214. For example, when the device connected to the USB I/F 213 is not a wireless LAN chip, the device connected to the USB I/F 213 is determined to be not a wireless LAN chip usable by the image forming apparatus 101. Also, when the wireless LAN chip is not usable by the image forming apparatus 101, the device connected to the USB I/F 213 is determined to be not a wireless LAN chip usable by the image forming apparatus 101.

At S505, the I/E processing unit 321 in the application 320a identifies the capability of the wireless LAN chip 214, and stores the identified capability in a storage device (for example, the RAM 203). The capability of the wireless LAN chip 214 may be identified by comparing the vendor ID and the device ID obtained at S503 with each record in the information table 322a. For example, the I/E processing unit 321 may identify that the wireless LAN chip 214 has the capability of ensuring using the frequency band of 2.4 GHz and WEP and WPA, and store the identified content in the storage device. In this manner, the vendor ID and the device ID acquired at S503 are used as information for identifying the capability of the wireless LAN chip 214.

At S506, the I/E processing unit 321 in the application 320a determines whether the use of the wireless LAN chip 214 is set. When it is determined that the use of the wireless LAN chip 214 is set ("YES" in S506), the control unit 200 ends the processing, and otherwise ("NO" in S506), the control unit 200 transitions the processing to S507. This determination may be performed based on the setting value stored in the setting value database 335. When the use of the wireless LAN chip 214 is set, the power supply to the wireless LAN chip 214 is continued, and therefore the control unit 200 in the image forming apparatus 101 can perform communication through the wireless LAN chip 214.

When the device connected to the USB I/F 213 is determined as not a wireless LAN chip usable by the image forming apparatus 101 and when it is determined that the wireless LAN chip is set to be unused, the processing transitions to S507. When thus determined, the control unit 200 in the image forming apparatus 101 does not use the device connected to the USB I/F 213. Thus, at S507, the application 320a may instruct the power control unit 341 to stop the power supply to the device (that is, the wireless LAN chip 214) connected to the USB I/F 213. In response to receiving the stop instruction of the power supply, the USB I/F control unit 342 stops supplying the power to the USB I/F 213.

The method of FIG. 6 is repeatedly performed during the operation of the image forming apparatus 101. At S601, the I/E processing unit 321 in the application 320a determines whether the import instruction has been received. In a case where it is determined that the import instruction has been received ("YES" in S601), the control unit 200 transitions the processing to S602, and otherwise ("NO" in S601), the control unit 200 repeats S601. The control unit 200 repeats S601 while waiting for the import instruction.

At S602, the I/E processing unit 321 in the application 320a determines whether a wireless LAN chip usable by the image forming apparatus 101 is connected to the image forming apparatus 101 (specifically, the USB I/F 213). In a case where it is determined that a wireless LAN chip usable by the image forming apparatus 101 is connected ("YES" in S602), the control unit 200 transitions the processing to S603, and otherwise ("NO" in S602), the control unit 200 transitions the processing to S606. This determination may be performed based on whether the storage device (e.g., the RAM 203) stores the capability of the wireless LAN chip. As described above with reference to FIG. 5, the capability of the wireless LAN chip is stored in the storage device at S505 in FIG. when a wireless LAN chip usable by the image forming apparatus 101 is connected. On the other hand, when a wireless LAN chip usable by the image forming apparatus 101 is not connected, the capability of the wireless LAN chip is not stored in the storage device. At S603, the I/E processing unit 321 in the application 320a acquires the capability of the wireless LAN chip 214 stored in the storage device.

At S604, the I/E processing unit 321 in the application 320a determines whether the wireless LAN chip 214 is operable at the setting value instructed to be imported based on the capability of the wireless LAN chip 214. In a case where the wireless LAN chip 214 is determined to be operable at the setting value ("YES" in S604), the control unit 200 transitions the processing to S605, and otherwise ("NO" in S604), the control unit 200 transitions the processing to S606. For example, the import instruction includes WPA2 as the setting value of the encryption standard, and the wireless LAN chip 214 is operable in WPA2. In this case, it is determined that the wireless LAN chip 214 is operable at the setting value instructed to be imported. In a case where a plurality of items are included in the import instruction, the I/E processing unit 321 may perform determination at S604 for each item.

At S605, the I/E processing unit 321 in the application 320a reflects the setting value instructed to be imported for the wireless LAN chip 214. For example, the I/E processing unit 321 in the application 320a instructs the setting reflection unit 331 in the setting management module 330 to replace this setting value with the existing setting value in the setting value database 335. The existing setting value may be a specific setting value, or may be a value (e.g., null) indicating that a specific value is not set. Additionally, in a case where there is a setting value pertaining to another application different from an application 302a in the setting values instructed to be imported, the I/E processing unit 321 in the other application reflects the setting value. For example, when an address book is included in the import data, the I/E processing unit in a SEND application reflects the address book. When the reflection by import is completed, a list of the imported address book is displayed via a transmission screen provided by the SEND application, and the user can select a destination to which scan data is transmitted. Also, when the import data includes administrator information, a system application reflects the setting value.

In a case where it is determined that a wireless LAN chip usable by the image forming apparatus 101 is not connected to the USB I/F 213 and when it is determined that the wireless LAN chip 214 is not operable at the setting value instructed to be imported, the processing transitions to S606. At S606, the I/E processing unit 321 in the application 320a discards the setting value instructed to be imported. For example, the TIE processing unit 321 ends the import processing pertaining to this setting value. In a case where there is a setting value pertaining to another application different from the application 302a in the setting values instructed to be imported, similarly to S505, the I/E processing unit in the other application performs reflection processing based on the setting value. That is, when the processing of S606 is performed, the setting value instructed to be imported is not reflected for the wireless LAN chip 214.

Figure 7:
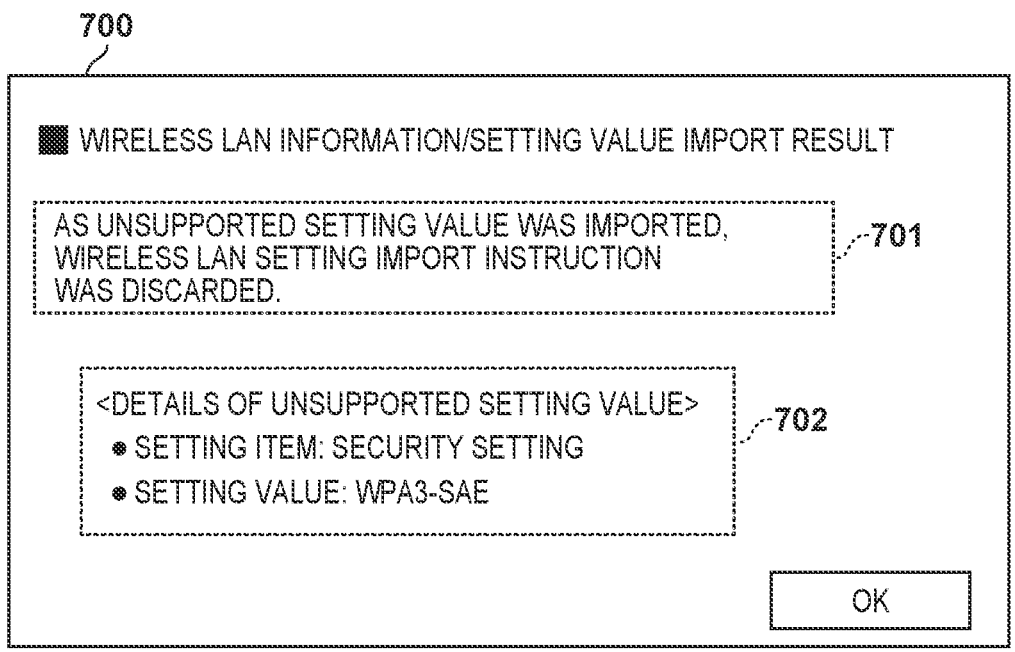
FIG. 7 is a schematic diagram for explaining an image example displayed on the image forming apparatus according to the first embodiment.

At S607, the I/E processing unit 321 in the application 320a may notify the user of the image forming apparatus 101 that the setting value has not been reflected for the wireless LAN chip 214. This notification may be performed by displaying, on the operation unit 206, an image indicating that the setting value cannot be reflected for the wireless LAN chip 214. With reference to FIG. 7, an example of an image 700 used for notification at S607 will be described. The image 700 may be displayed on the entire operation unit 206, or may be displayed on a part of the operation unit 206 so that the user can perform other operations. The image 700 includes a message 701 notifying that the import instruction has been discarded, and information 702 indicating the discarded setting value. The example of the image 700 indicates that the setting value pertaining to the encryption standard (WPA3-SAE) has been discarded. The information 702 further indicates items of the discarded setting values.

According to the above-described method, it is possible to appropriately determine whether the setting value instructed to be imported is reflected based on the capability of the wireless LAN chip connected to the image forming apparatus 101. In addition, in the method described above, the control unit 200 does not communicate with the wireless LAN chip 214 until the setting value is reflected at S606 after the import instruction has been received at S601. Thus, even when the wireless LAN chip 214 is set to be unused and therefore the power is not supplied to the wireless LAN chip 214, the control unit 200 can reflect the instructed setting value without the supply of power to the wireless LAN chip 214. As a result, compared with a case in which the wireless LAN chip 214 is communicated after the import instruction is received, this reduces processing time and a processing load of import.

In the above-described embodiment, the control unit 200 identifies the capability of the wireless LAN chip 214 and stores the capability in the storage device at S505, and acquires the capability from the storage device at S603. Alternatively, the control unit 200 may store the vendor ID and the device ID in the storage device at S505, and identify the capability of the wireless LAN chip 214 using the vendor ID and the device ID stored in the storage device at S603. In this case as well, the control unit 200 can determine whether the wireless LAN chip 214 is operable at the setting value instructed to be imported without communication with the wireless LAN chip 214 after receiving the import instruction.

In the embodiment described above, the wireless LAN chip 214 is connected to the image forming apparatus 101 through the USB I/F 213.

Alternatively, the wireless LAN chip 214 may be connected to the image forming apparatus 101 through an interface of another standard (for example, an M.2 interface).

Second Embodiment

In the image forming apparatus 101 according to the second embodiment, the operation performed while the image forming apparatus 101 is in operation is different from the first embodiment, and other points may be similar to the first embodiment. Therefore, the differences from the first embodiment will be mainly described below, and overlapping description will be omitted.

Figure 8:
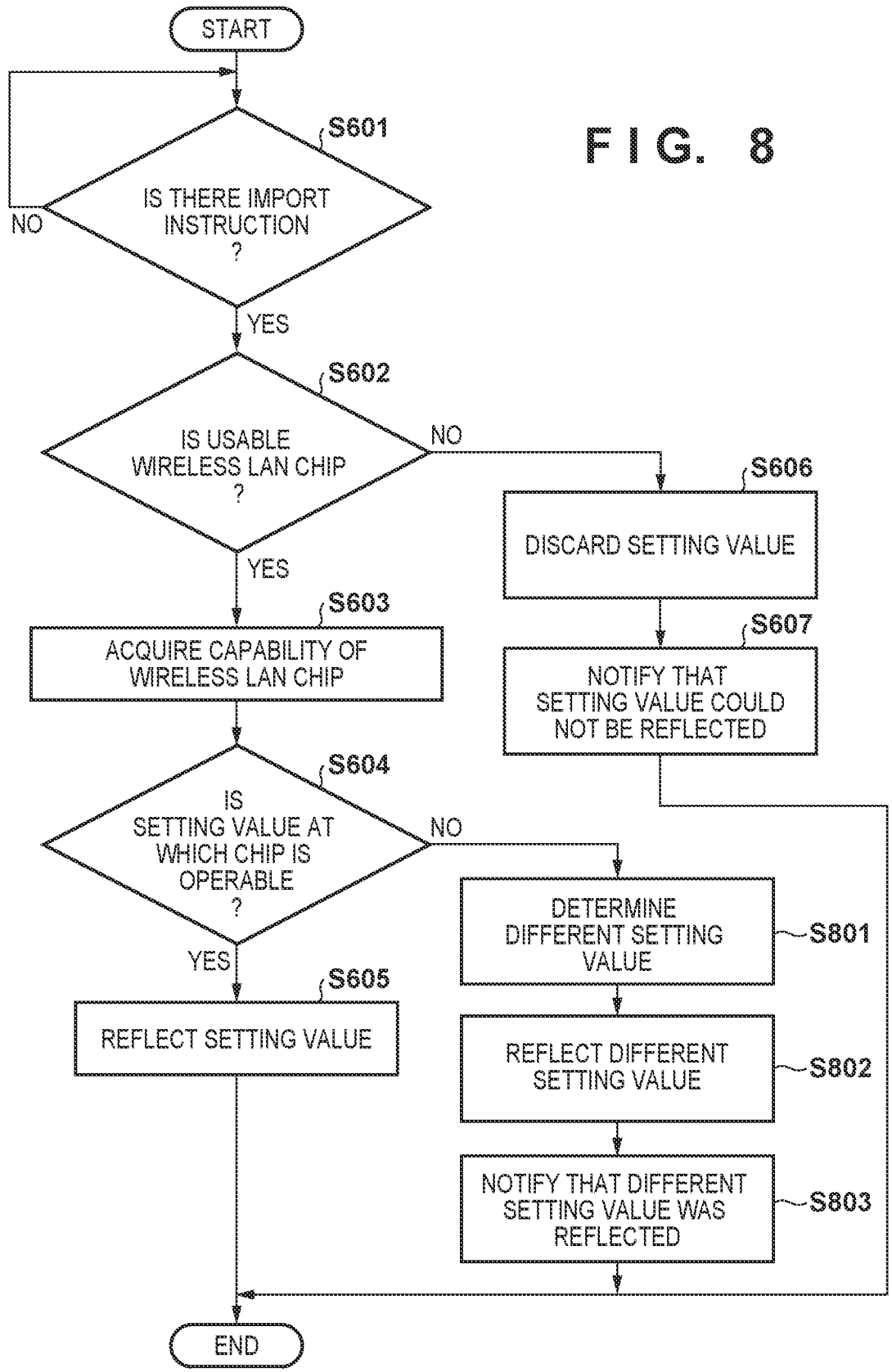
FIG. 8 is a flowchart for explaining an operation example of an image forming apparatus according to a second embodiment.

With reference to FIG. 8, the operation example of the image forming apparatus 101 will be explained. The operation of the image forming apparatus 101 may be performed by the CPU 201 executing a program stored in a memory, such as the ROM 202 or the RAM 203. Alternatively, some or all of the steps in FIG. 8 may be performed by a dedicated circuit, such as an ASIC.

S601 to S607 of the method of FIG. 8 may be similar to those of FIG. 6 of the first embodiment. However, at S604, when it is determined that the wireless LAN chip 214 is not operable at the setting value instructed to be imported ("NO" in S604), the control unit 200 transitions the processing to S801.

At S801, the I/E processing unit 321 in the application 320a determines a different setting value that is associated with the setting value instructed to be imported and allows the wireless LAN chip 214 to operate. The different setting value associated with the setting value instructed to be imported may be the different setting value pertaining to the same item as that of the setting value instructed to be imported. For example, when the setting value instructed to be imported is a setting value pertaining to the encryption standard, the different setting value pertaining to the encryption standard is determined. Furthermore, in a case where there is a plurality of setting values satisfying the condition, the I/E processing unit 321 may determine any one of the setting values as the different setting value used in subsequent processing.

At S802, the I/E processing unit 321 in the application 320a reflects the setting value instructed to be imported for the wireless LAN chip 214. The processing of reflecting the different setting value in this manner may be referred to as rounding processing. The reflection of the different setting value may be performed similarly to the reflection of the setting value at S605.

Figure 9:
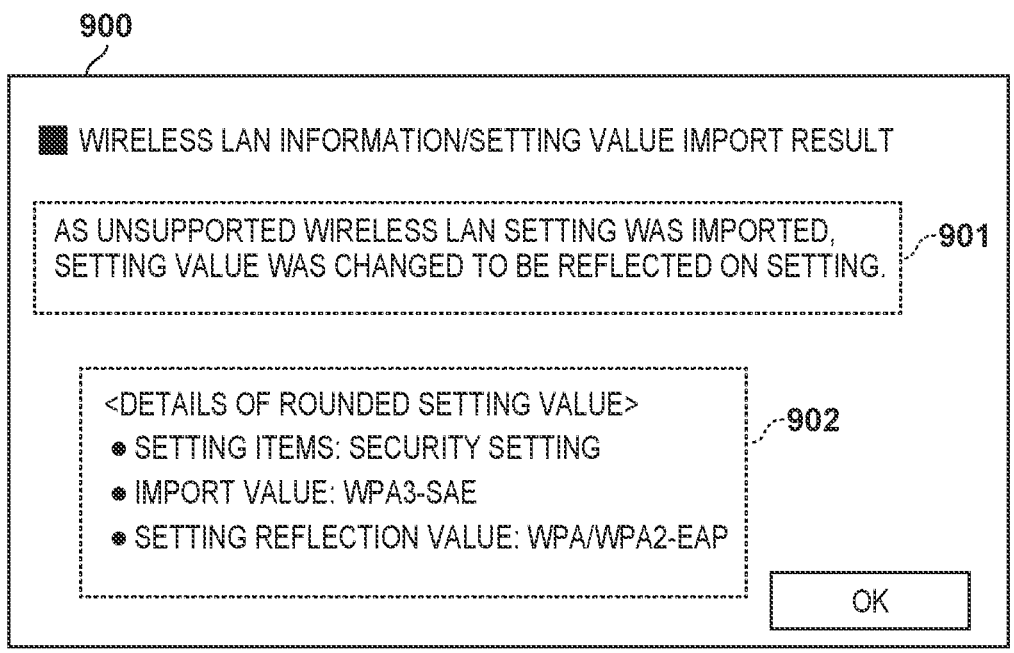
FIG. 9 is a schematic view for explaining an image example displayed on the image forming apparatus according to the second embodiment.

At S803, the I/E processing unit 321 in the application 320a may notify the user of the image forming apparatus 101 that the different setting value has been reflected for the wireless LAN chip 214. This notification may be performed by displaying, on the operation unit 206, an image indicating that the different setting value has been reflected for the wireless LAN chip 214. With reference to FIG. 9, an example of an image 900 used for notification at S803 will be described. The image 900 may be displayed on the entire operation unit 206, or may be displayed on a part of the operation unit 206 so that the user can perform other operations. The image 900 includes a message 901 notifying that the different setting value has been reflected, and information 902 indicating the reflected setting value. The example of the image 900 indicates that the setting value pertaining to the encryption standard (WPA/WPA2-EAP) has been reflected. The information 902 further indicates items to which the different setting values have been reflected.

According to the present embodiment, even in a case where the wireless LAN chip 214 cannot be operated at the setting value instructed to be imported, the different setting value associated with the setting value can be reflected.

Third Embodiment

In the image forming apparatus 101 according to the third embodiment, the operation of the image forming apparatus 101 is different from the first embodiment, and other points may be similar to the first embodiment. Therefore, the differences from the first embodiment will be mainly described below, and overlapping description will be omitted.

Figure 10:
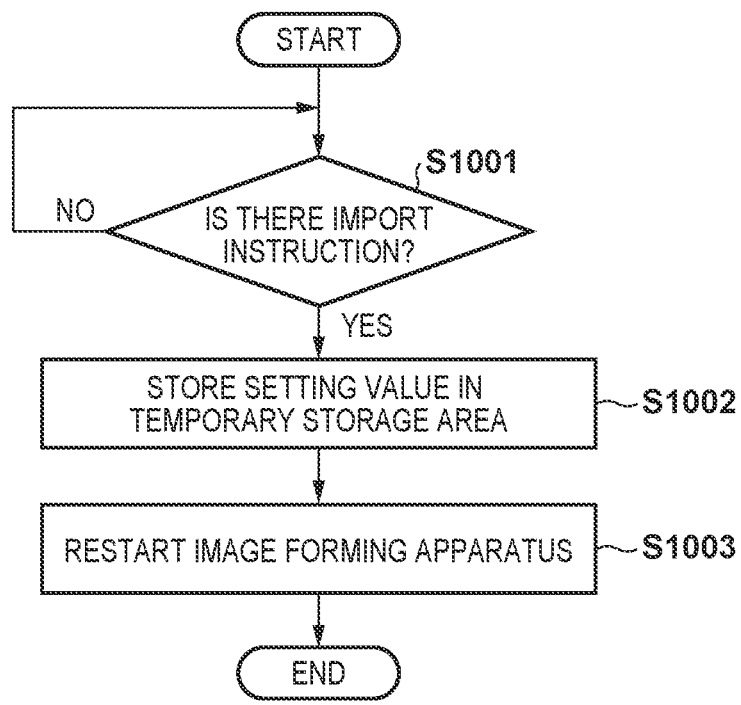
FIG. 10 is a flowchart for explaining an operation example of an image forming apparatus according to a third embodiment.
Figure 11A:
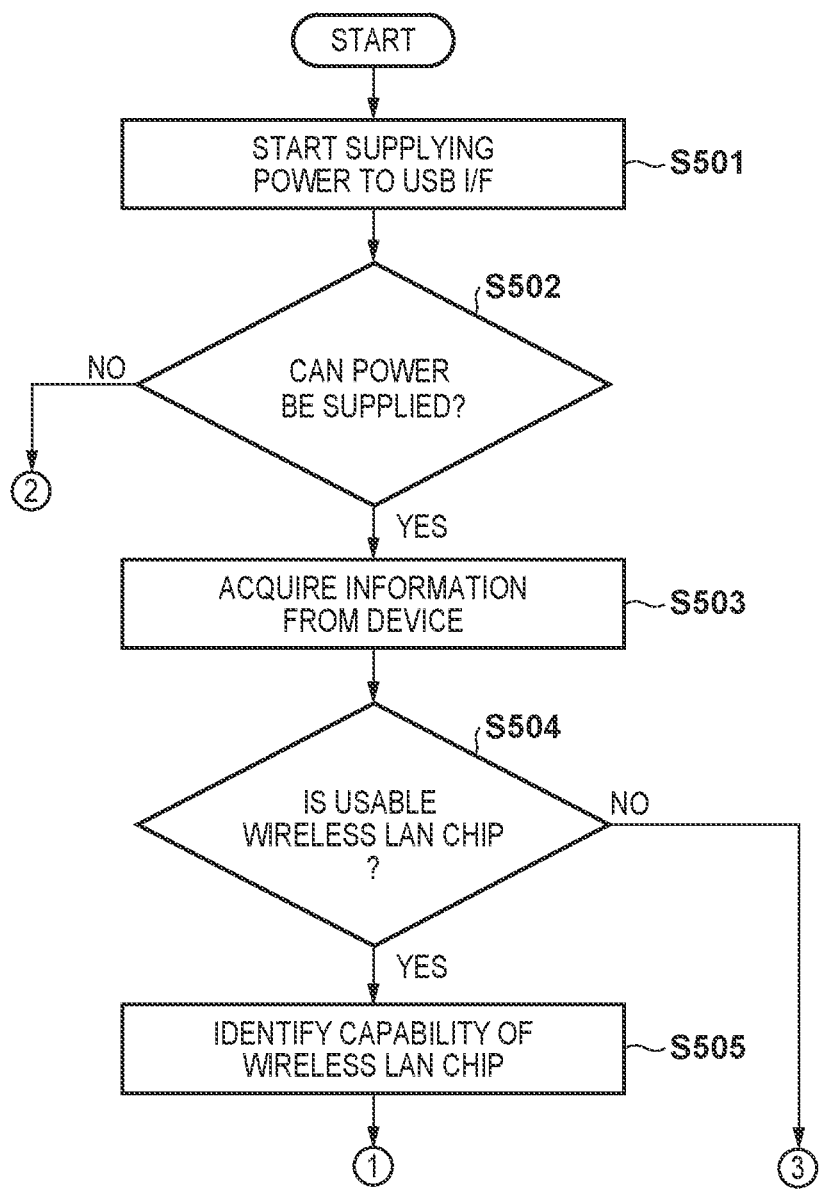
FIGS. 11A and 11B are flowcharts for explaining an operation example of the image forming apparatus according to the third embodiment.
Figure 11B:
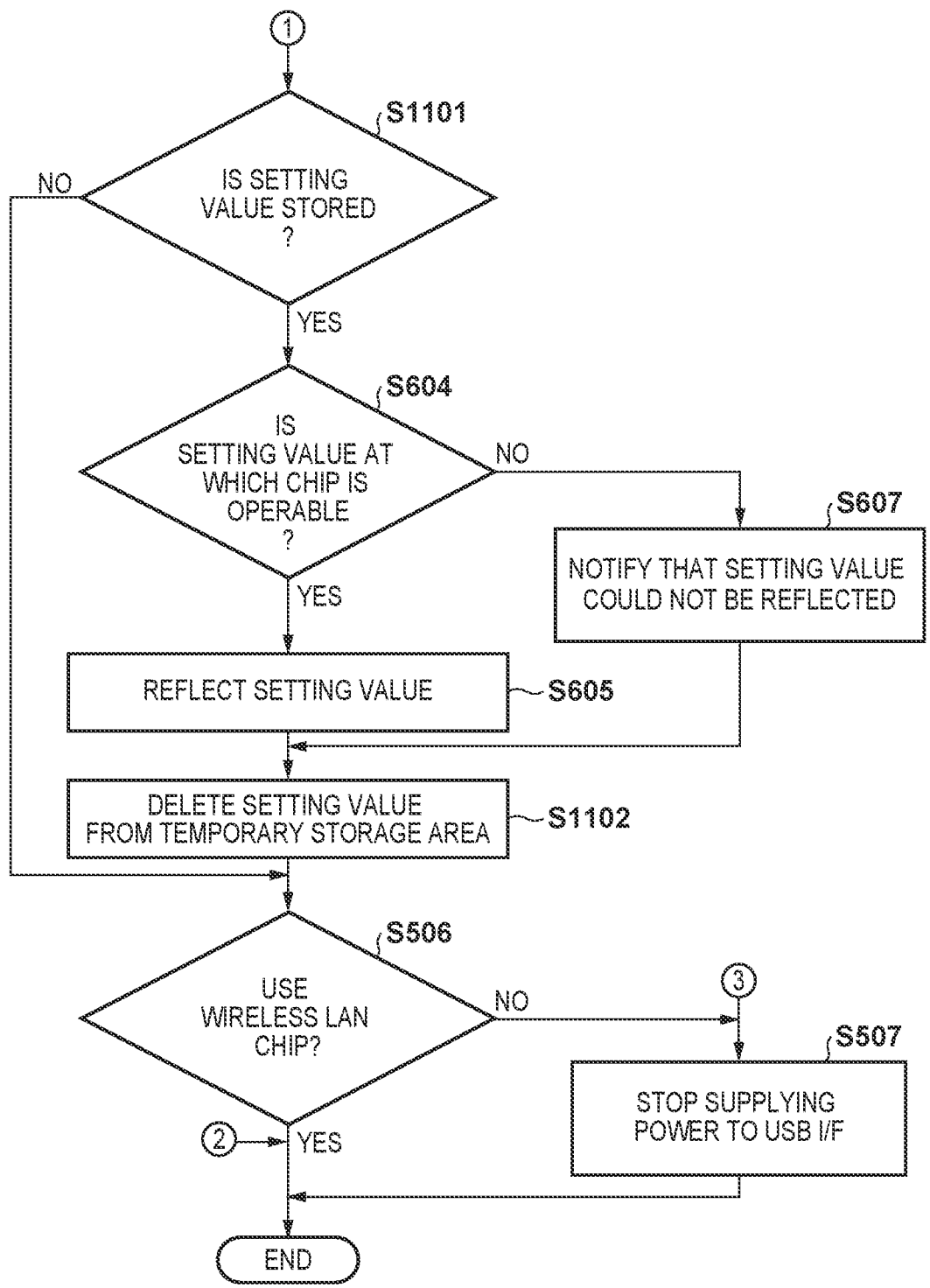

With reference to FIG. 10 to FIG. 11B, the operation example of the image forming apparatus 101 will be explained. The operation of the image forming apparatus 101 may be performed by the CPU 201 executing a program stored in a memory, such as the ROM 202 or the RAM 203. Alternatively, some or all of the steps in FIG. 10 to FIG. 11B may be performed by a dedicated circuit, such as an ASIC.

The method of FIG. 10 is repeatedly performed during the operation of the image forming apparatus 101.

Similarly to S601 in FIG. 6, the I/E processing unit 321 in the application 320a waits for the import instruction at S1001. At S1002, the I/E processing unit 321 in the application 320a acquires the import data from the I/E processing unit 334 in the setting management module 330, and stores the setting value in the temporary storage area in the storage device (e.g., the HDD 204). At S1003, the I/E control module 310 restarts the image forming apparatus 101.

The method of FIGS. 11A and 11B is performed at the start of the image forming apparatus 101. Thus, in response to the image forming apparatus 101 restarting at S1003 described above, the method of FIGS. 11A and 11B is performed during restart. S501 to S507 of the method of FIGS. 11A and 11B may be similar to those of FIG. 5 according to the first embodiment. S604, S605, and S607 of the method of FIG. 11B may be similar to those of FIG. 6 according to the first embodiment. After the capability of the wireless LAN chip 214 has been identified at S505, S1101 is performed.

At S1101, the I/E processing unit 321 in the application 320a determines whether the temporary storage area in the storage device stores the setting value for the wireless LAN chip 214. In the case where the setting value is determined to be stored ("YES" in S1101), the control unit 200 transitions the processing to S604, and otherwise ("NO" in S1101), the control unit 200 transitions the processing to S506. In the case where the import instruction has been received at S1101 in FIG. 11B, the setting value is stored in the temporary storage area. Therefore, the setting value not stored in the temporary storage area indicates that the import instruction is not received. In this case, the VE processing unit 321 performs S506 without performing the processing for reflecting the setting value (specifically, S604, S605, or S607).

On the other hand, the storage of the setting value in the temporary storage area indicates that the import instruction has been received. In this case, the VE processing unit 321 performs processing for reflecting the setting value (specifically, S604, S605, and S607). Thereafter, at S1102, the VE processing unit 321 deletes the setting value from the temporary storage area in the storage device. This makes it possible to avoid performing unnecessary processing to reflect the setting value at the next start-up of the image forming apparatus 101.

According to the above-described method, it is possible to appropriately determine whether the setting value instructed to be imported is reflected based on the capability of the wireless LAN chip connected to the image forming apparatus 101.

When the application 320a can use the wireless LAN chip 214 at the time when the import instruction is received at S1101 in FIG. 11B, the control unit 200 may perform the processing at and after S602 in FIG. 6 instead of the processing at and after S1102.

Fourth Embodiment

In the image forming apparatus 101 according to the fourth embodiment, the operation of the image forming apparatus 101 is different from the third embodiment, and other points may be similar to the third embodiment. Therefore, the differences from the third embodiment will be mainly described below, and overlapping description will be omitted. In the fourth embodiment, similarly to the second embodiment, the control unit 200 reflects the different setting value to the image forming apparatus 101 by performing S801 to S803 in FIG. 8.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-008197, filed Jan. 21, 2022, which is hereby incorporated by reference herein in its entirety.

What is claimed is:

1. An image forming apparatus connectable to a plurality of types of wireless Local Area Network (LAN) chips, the image forming apparatus comprising at least one memory and at least one processor and/or at least one circuit which function as:
   an identification unit configured to identify a capability of a wireless LAN chip connected to the image forming apparatus;
   a reception unit configured to receive an instruction to import a setting value represented by import data obtained from an external apparatus different from the wireless LAN chip;
   a determination unit configured to determine whether the wireless LAN chip connected to the image forming apparatus is operable at the setting value based on the identified capability; and
   a reflection unit configured to reflect the setting value to a specific item of the image forming apparatus related to for the wireless LAN chip connected to the image forming apparatus in a case where it is determined that the wireless LAN chip connected to the image forming apparatus is operable at the setting value.

2. The image forming apparatus according to claim 1, wherein
   the identification unit identifies the capability of the wireless LAN chip connected to the image forming apparatus based on information acquired by communication with the wireless LAN chip connected to the image forming apparatus.

3. The image forming apparatus according to claim 2, wherein
   the identification unit acquires the information by communication with the wireless LAN chip connected to the image forming apparatus at a start of the image forming apparatus.

4. The image forming apparatus according to claim 2, wherein the at least one memory and the at least one processor and/or the at least one circuit further function as
   a power control unit configured to control power supply to the wireless LAN chip connected to the image forming apparatus, wherein
   the power control unit stops the power supply to the wireless LAN chip after the information is acquired in a case where the wireless LAN chip connected to the image forming apparatus is set to be unused.

5. The image forming apparatus according to claim 2, wherein
the image forming apparatus stores association information that associates identification information identifying each type of the plurality of types of the wireless LAN chips with capability information of the wireless LAN chips of the type, and
the information is identification information identifying a type of the wireless LAN chip, the image forming apparatus is connected to the wireless LAN chip via a Universal Serial Bus (USB) interface or an M.2 interface, and the identification unit identifies the capability of the connected wireless LAN chip based on the information and the association information.

6. The image forming apparatus according to claim 1, wherein
the reflection unit does not reflect the setting value to the specific item of the image forming apparatus related to the wireless LAN chip connected to the image forming apparatus in a case where it is determined that the wireless LAN chip connected to the image forming apparatus is not operable at the setting value.

7. The image forming apparatus according to claim 6, wherein the at least one memory and the at least one processor and/or the at least one circuit further function as
a notification unit configured to notify a user of the image forming apparatus that the setting value has not been reflected for the wireless LAN chip connected to the image forming apparatus.

8. The image forming apparatus according to claim 1, wherein
the reflection unit reflects a different setting value that is associated with the setting value and at which the wireless LAN chip connected to the image forming apparatus is operable in a case where it is determined that the wireless LAN chip connected to the image forming apparatus is not operable at the setting value.

9. The image forming apparatus according to claim 8, wherein the at least one memory and the at least one processor and/or the at least one circuit further function as
a notification unit configured to notify a user of the image forming apparatus of the reflection of the different setting value.

10. The image forming apparatus according to claim 1, wherein
the determination unit determines whether the wireless LAN chip is operable at the setting value without communication with the wireless LAN chip connected to the image forming apparatus after reception of the instruction to import the setting value.

11. The image forming apparatus according to claim 1, wherein
the identification unit communicates with the wireless LAN chip connected to the image forming apparatus after reception of the instruction to import the setting value to acquire information to be used to identify the capability of the wireless LAN chip.

12. The image forming apparatus according to claim 11, wherein the at least one memory and the at least one processor and/or the at least one circuit further function as:
a storage unit configured to store the setting value in a storage device; and
a restart unit configured to restart the image forming apparatus after the setting value is stored in the storage device and before it is determined whether the wireless LAN chip connected to the image forming apparatus is operable at the setting value, wherein
the identification unit communicates with the wireless LAN chip connected to the image forming apparatus during the restart of the image forming apparatus to acquire the information.

13. A non-transitory storage medium that stores a program for causing a computer to function as each of the units of the image forming apparatus according to claim 1.

14. The image forming apparatus according to claim 1, wherein the import data is export data exported from the image forming apparatus or another image forming apparatus.

15. The image forming apparatus according to claim 14, wherein the export data is data representing a setting value set in the image forming apparatus or the other image forming apparatus.

16. The image forming apparatus according to claim 1, wherein the setting value is at least one of WPA, WPA2, and WPA3 which are to be set to a setting item related to security.

17. The image forming apparatus according to claim 16, wherein
the reflection unit reflects the setting value in a case where it is determined that the setting value is WPA2 and the wireless LAN chip is operable at WPA2, and
the reflection unit does not reflect the setting value in a case where it is determined that the setting value is WPA3-SAE and the wireless LAN chip is not operable at WPA3-SAE.

18. A method for controlling an image forming apparatus connectable to a plurality of types of wireless LAN chips, the method comprising:
identifying a capability of a wireless LAN chip connected to the image forming apparatus;
receiving an instruction to import a setting value represented by import data obtained from an external apparatus different from the wireless LAN chip;
determining whether the wireless LAN chip connected to the image forming apparatus is operable at the setting value based on the identified capability; and
reflecting the setting value to a specific item of the image forming apparatus related to for the wireless LAN chip connected to the image forming apparatus in a case where it is determined that the wireless LAN chip connected to the image forming apparatus is operable at the setting value.

* * * * *